United States Patent [19]

Mackenzie

[11] 3,963,503
[45] June 15, 1976

[54] METHOD OF MAKING GLASS PRODUCTS, NOVEL GLASS MIX AND NOVEL GLASS PRODUCT

[75] Inventor: John D. Mackenzie, Los Angeles, Calif.

[73] Assignee: The Regents of the University of California, Berkeley, Calif.

[22] Filed: Mar. 14, 1975

[21] Appl. No.: 558,510

Related U.S. Application Data

[62] Division of Ser. No. 268,971, July 5, 1972, Pat. No. 3,900,303.

[52] U.S. Cl. .............................. 106/40 V; 106/40 R; 106/47 R; 106/52
[51] Int. Cl.[2] ...................... C03C 3/00; C03C 1/00; C04B 21/00
[58] Field of Search ................. 106/40 R, 40 V, 52, 106/41, 47 R

[56] References Cited
UNITED STATES PATENTS

| | | | |
|---|---|---|---|
| 2,156,457 | 5/1939 | Long | 106/40 V |
| 2,233,608 | 3/1941 | Haux et al. | 106/40 V |
| 3,116,522 | 1/1964 | Taylor et al. | 106/41 |
| 3,288,615 | 11/1966 | Estes et al. | 106/41 |

*Primary Examiner*—Patrick P. Garvin
*Assistant Examiner*—Mark Bell
*Attorney, Agent, or Firm*—Nilsson, Robbins, Dalgarn & Berliner

[57] ABSTRACT

An improved method of making glass products is provided which comprises mixing particulate used-container glass with a selected treating agent to form a unique glass mix. The used-container glass has a preselected approximate concentration range of foreign inclusions and an average reflectance of about 5% to about 95%. The mix is heated to a temperature and pressure above the sintering and softening point of the glass but below its melting point and within a range sufficient to activate the treating agent to either foam or fill the glass. In the latter case, increased pressure is applied to form the glass into a hard pressed product, such as a tile, appearance. In the former case, foamed glass of distinctive appearance is produced. The used-container glass includes a plurality of particles of various colors, and the pressed product may have oxide pigments embedded in the surfaces thereof. The treating agent can be dolomite or other suitable treating agent.

8 Claims, No Drawings

3,963,503

METHOD OF MAKING GLASS PRODUCTS, NOVEL GLASS MIX AND NOVEL GLASS PRODUCT

This is a division of application Ser. No. 268,971 filed July 5, 1972, now U.S. Pat. No. 3,900,303.

BACKGROUND

1. Field of the Invention

The present invention generally relates to glass and more particularly to glass products incorporating used-container glass having a selected concentration of foreign inclusions.

2. Prior Art

Used glass containers have become a waste disposal problem of immense magnitude. In California alone, some 50 million bottles are discarded each week. Current efforts to solve the ecological problem created by such large quantities of waste glass have largely been directed to reclaiming the glass by procedures which typically involve sorting the glass containers by color and type, then removing all foreign materials, such as cellulosic labels, metal caps, metal retaining strips and the like therefrom and finally remelting the bottles. The sorting and cleanup procedures before the remelting are expensive and time consuming so that, to date, recycling of glass has not been carried out on a wide scale.

Container glass is also recycled by crushing it to a fine granular form, usually after removing metallic caps, strips and the like therefrom, and then adding the granulated glass as a filler in minor proportions to asphalts and tars. The resulting mix is used as a durable paving material. Such usage thus far also has not been sufficiently extensive to counteract an increasing need to clean up the environment, as by the development of economically attractive procedures and uses for used glass containers. Such new procedures should involve inexpensive reclaiming steps so as to encourage their widespread and extensive application to the vast quantities of glass containers accumulating week by week.

SUMMARY

The present invention is substantially as set forth in the Abstract above. In this regard, an improved method of making glass is provided which satisfies the foregoing needs and requirements. Such method employs a novel mix incorporating used-container glass and results in a variety of new products capable of being used extensively in the construction and other industries. The method is inexpensive, simple and effective and the products thereof can be in the form of foamed glass of distinctive decorative appearance, or in the form of pressed products such as tiles, bricks and the like.

Foamed glass can be provided in a wide range of densities, sizes, shapes and appearances by varying the foaming and molding parameters. It has excellent thermal, sound and electrical insulative properties and is non-flammable, strong, light, chemically resistant and durable. Moreover, foamed glass products of the present invention have an improved color appearance, texture and reflectance due to the use therein of used-container glass. Accordingly, the foamed glass products of the invention can be used both as structural and as decorative materials and, indeed, in a variety of other applications.

Pressed products such as tiles in accordance with the present invention are useful as decorative and structural coverings for floors, walls, furniture and the like. Their unique appearance depends on the use of used-container glass therein and can be varied easily by the addition of certain inclusions to the surfaces therein. Such pressed products are hard, durable, impact resistant, light in weight and inexpensive. Their extensive use along with foamed glass products of the invention will substantially favorably affect the environment by reducing the available quantities of waste glass. Further features of the invention are set forth in the following detailed description.

DETAILED DESCRIPTION

Mixing

In accordance with the method of the present invention, used-container glass in particulate form is mixed with a selected treating agent to form the novel mix of the invention.

The used-container glass comprises a plurality of used glass containers of various types, sizes, shapes and colors mixed together without previous cleaning or removal of labels, caps, cap remnants, such as sealing strips of metal, plastic and like materials. This mixture of glass containers is particulated in the unsorted state to any desirable particle size, along with the caps, strips, labels and the like to provide particulate used-container glass having the following approximate concentrations of foreign inclusions:

| Inclusions | % by weight in glass (range) |
| --- | --- |
| Fe | 0.1 to 3 |
| Sn | 0.1 to 2 |
| Al | 0.1 to 2 |
| Other metals | 0.1 to 1 |
| Cellulosics | 0.1 to 1 |
| Other organics | 0.1 to 1 |

Moreover, the particulate used-container glass is also identifiable by its average reflectance of about 5% to about 95% and its multi-colored appearance. The relative reflectance will vary with particle size. However, for every range of particle size, so long as the range is kept constant, the white, plain glass reflectance is taken at 100% and the colored glass reflectance is taken at 0%.

The particulation of the glass containers to form the used-container glass can be achieved by any suitable means, as by grinding, pressing and crushing, ball milling or the like. No sorting, grading or preselecting need be carried out before or after the particulation. The waste glass containers forming the source or stock from which the used-container glass is obtained can be the usual representative assortment of glass containers. Usually, the particulation thereof reduces the glass and inclusions to an average particle size of about 5 to about 200 mesh, for example, 100 mesh, although other particle sizes sufficient to produce desired blending can be provided.

The selected treating agent is a glass foaming agent and/or filler, fillers being employed when hot pressed products are desired. Foaming agents such as lithium carbonate, potassium carbonate and other conventional glass foaming agents can be employed, as well as the novel glass foaming agents more particularly set forth in my copending U.S. patent application Ser. No. 268,998, filed of even date with the present application, now abandoned. The novel glass foaming agents are dolomite, strontium carbonate, barium carbonate, and mixtures thereof.

The foaming agent is usually utilized in the present method with the particulate used-container glass in a concentration of about 0.5 to about 10 percent by weight of the combined mixture, although other suitable concentrations could be employed, if desired. It will be understood that mixtures of foaming agent in solid and/or liquid form can be used in such mix. Moreover, conventional fillers which do not materially impair foaming, and pigments and the like conventional additives can also be present in the mix, but those additives form no part of the present invention.

The treating agent can be a filler for the used-container glass and when used is usually present in a concentration in the mix of about 10 to about 80 percent by weight of the mix, preferably about 40–60 weight percent, although other concentrations can be employed, if desired. For such purposes, such conventional fillers as clays, asbestos, fiberglass and the like can be used. Mixtures of two or more of such fillers can be used, with or without such additives as pigments, texturizing agents, etc.

The mixing of the treating agent and particulate used-container glass should be sufficient to uniformly blend these ingredients together. The treating agent, to facilitate such blending, usually is in a solid particulate form, for example, of about 100 mesh or the like. The mixing can be effected by mechanical stirring, regrinding, tumbling or other conventional means. The resulting novel mix can be sold as such, ready for conversion to useful glass products on application of heat (with or without pressure).

Heating and Holding

The mix so obtained is, in accordance with the present method, placed in a suitable container, such as a mold or the like, and heated to a temperature and pressure within a range sufficient to sinter and soften the glass component thereof and activate the treating agent, but insufficient to melt the glass. The mix is then held within that range until the treating agent is activated and the desired product is obtained.

It is important that the identifiability of the glass particles be retained while coalescing the same into a strong unitary structural mass. If the glass were allowed to thoroughly melt, the multi-colored unique individual appearance of the products would be lost. Accordingly, the treating temperature is usually kept in the range of about 500°–1000°C., most usually about 600°–900°C., while treating pressures of from about 10 p.s.i. to about 10,000 p.s.i. are applied, depending upon the particular properties desired in the finished product.

The residence time of the mix at treating temperature and pressure varies, depending on the results desired, but generally is long enough to allow the treating agent to fully act on the mix. Typical residence times for foaming agents are about 2 min. to about 120 min., while typical residence times for pressing operations involving fillers are about 1 second to about 60 minutes.

In the event that a foamed glass product is desired, the treating agent comprises a foaming agent and the usual treating parameters are a temperature of about 600°–900°C. and about atmospheric pressure. The treating agent is selected so that at the treating temperature in the presence of the glass it is activated to release a gas such as carbon dioxide, nitrogen, steam or the like, which gas causes the softened glass to expand. The extent of foaming depends on the treating agent selected, its concentration, and the temperature, pressure and residence time. The extent of foaming can be controlled to produce products having densities of from about 0.1 gm./cc. to about 2.0 gm./cc.

The surface texture of the foamed glass product can be controlled, as by smoothing it mechanically while in the softened state, or by applying a smooth surfaced top cover to the mold or other container in which the mix is heat treated, so that the glass contacts the cover before cooling to a solid state.

When a pressed product is desired, pressing of the mix during heat treating is effected to coalesce the filler (treating agent) with the glass particles and weld the glass and filler into a unitary mass, with the particles thereof still retaining their relative positions. After cooling to below the solidification point thereof, a hard finished multi-colored product is obtained. For such purposes, the pressing can be at up to about 10,000 p.s.i. or more, and can be carried out in any suitable manner, such as through the use of a moveable cover pressed downwardly within a mold in which the mix is heat treated. Other suitable pressing means can be employed.

The hot pressing can be supplemented by applying to surface(s) of the mix or pressed product pigments in the form of inorganic oxides such as ferric oxide, lead oxide or the like or metals and/or sheet(s) of glass to which the mix or pressed product is then bonded under suitable heat and pressure to provide a finished product of controlled appearance. Typical pressures and temperatures are those within the described heat treating ranges.

Cooling and Recovery

The foamed or pressed glass product is then cooled to below the solidification point thereof, as by turning off the heat to the heating zone and allowing the product to cool gradually, for example overnight, or by transferring the product to a cooling zone wherein heat is more rapidly removed. The cooled glass product is then recovered in a condition ready for use. Annealing of the product by heating to conventional annealing temperatures and pressures can be employed, if desired, to relieve internal stresses.

Accordingly, improved glass products of distinctive multi-colored appearance are provided in accordance with the present invention. Certain other features of the present invention are illustrated in the following Examples.

EXAMPLE 1

In a first run, 100 lbs. of a typical mixed lot of unsorted, uncleaned, used glass containers, including labels, cap strips, caps and the usual associated materials, are ground and sieved to an average particle size of about 200 mesh, the product having an average reflectance of 20 and the following approximate concentrations of foreign inclusions:

| Foreign Inclusions | % by Weight |
|---|---|
| Fe | 0.2 |
| Sn | 0.1 |
| Al | 1.2 |
| Other metals | 0.1 |
| Cellulosics | 0.5 |
| Other organics | 0.4 |

The used-container glass is then mixed with 2 lbs. of strontium carbonate of average particle size of about 100 mesh. The resulting mixture of particulate used-container glass and strontium carbonate is passed into an open topped mold and is heated therein to about 950°C. and is held at about that temperature for about 5 min., to foam the mixture to approximately 300 percent of its original volume and reduce the density thereof to about 0.2gm./cc. During foaming the particles of glass soften (but do not melt), expand and weld together to provide a unitary foamed product. Thereupon, the foamed product is allowed to cool over about 2 hrs. to room temperature and the mold is stripped therefrom. The finished product has a unique mottled appearance with an average reflectance of about 20%, and tensile strength of about 200 p.s.i. It is useful as a structural and decorative material, can be sawed, drilled, ground or otherwise worked, and is resistant to water, chemicals and wear.

In a parallel run, the procedure of the first run is used, except that dolomite is substituted for the treating agent of the first run and is used in a concentration of about 1 lb. Heat treating is effected at about 900°C. for about 20 minutes and the surface of the foamed glass product is smoothed mechanically before cooling of the product to below its solidification point. The finished product is of a distinctive, brilliant multi-colored hue, metallic inclusions being clearly visible therein. It has a density of 0.4 gm./cc. and is useful for the same purposes as the product of the first run.

In a third run, the procedure and parameters of the second run are paralleled, except that barium carbonate is substituted for dolomite and used in 2 lb. amount. The heat treating temperature is 950°C. and residence time 10 minutes at atmospheric pressure. A low melting glaze is added to the heat-treated product before cooling thereof. Comparable results are obtained to those of the first two runs except that the density of the product is 0.5gm./cc.

EXAMPLE II

In a fourth run, the procedure and parameters of the first run of Example 1 are generally followed, except that the amount of treating agent mixed with the used-container glass is 100 lbs. The used-container glass has an average reflectance of 40 and the following approximate concentrations of foreign inclusions:

| Foreign Inclusions | % by Weight |
| --- | --- |
| Fe | 0.1 |
| Sn | 0.1 |
| Al | 1.0 |
| Other metals | 0.1 |
| Cellulosics | 0.7 |
| Other organics | 0.3 |

The heat treating is carried out at 850°C. and at an increased pressure of about 2000p.s.i. over a residence time of about 2 minutes, after which the pressed product is cooled over 2 hours to room temperature and recovered as a hard, smooth, strong, slate-like product having a tensile strength of about 6000p.s.i. and a density of 2.5gm./cc. Such product is non-flammable, capable of withstanding thermal shock and is inexpensive and durable. It has a distinctive mottled appearance with an average reflectance of 60%. It is useful as roofing material, floor and wall tile, artificial slate and artificial marble.

In a fifth run, the procedure and parameters of the fourth run are followed, except that the treating agent is Fly Ash and is used in 100 lb. amount in the mix. Moreover, the heat treating temperature is 900°C., pressure is 1000p.s.i. and residence time is 2 minutes. Before cooling is effected, ferric oxide powder is sprinkled on the surfaces of the glass product and the product is pressed again at 1000p.s.i. for about 1 minute. The finished product obtained after cooling has a tensile strength of 7000 p.s.i., density of 2.2gm./cc. and a distinctive multi-colored brilliant appearance with an average reflectance of 50%. It is useful for the same purposes as described for the product of the fourth run.

In a sixth run, the procedure and parameters of the fourth run are followed, except that the filler is sand and is used in 80 lb. amount in the mix. Heat treating conditions are as follows: temperature 1000°C., pressure 500 p.s.i. and residence time 1 minute. Moreover, before cooling, the pressed product is bonded to a clear glass sheet under 500 p.s.i. pressure and 700°C. temperature to provide a finished product with 60% average reflectance, 5000 p.s.i. tensile strength and 2.3gm./cc. density. It is of distinctive, bright, multi-colored appearance, with a hard, glossy surface and is particularly useful as decorative tile.

Accordingly, an improved method, glass mix and glass products are provided. The products are of distinctive appearance and are inexpensive to make by the present method. They provide an effective solution to the present ecological problem of disposing of large quantities of used-container glass.

Various modifications, changes, alterations and additions can be made in the present method and its steps, and in the present mix and the present glass products. All such modifications, changes, alterations and additions as are within the scope of the appended claims form part of the present invention.

I claim:

1. An improved heat treatable glass mix comprising: used-container glass having the following approximate concentration of foreign inclusions mixed therewith:

| Inclusions | % by wt. in glass |
| --- | --- |
| Fe | 0.1 to 3 |
| Sn | 0.1 to 2 |
| Al | 0.1 to 2 |
| Other metals | 0.1 to 1 |
| Cellulosics | 0.1 to 1 |
| Other organics | 0.1 to 1 | said used-container glass having an average reflectance of between about 5% and about 95%; and
a carbonate foaming agent mixed therewith in a concentration of about 0.5 to about 10 percent by weight of the mix, said foaming agent being activatable upon heating said used-container glass to a temperature and pressure within a range sufficient to sinter and soften said glass but insufficient to melt said glass.

2. The improved mix of claim 1 wherein said foaming agent comprises dolomite.

3. An improved solid glass product comprising a unitary multi-colored mass of sintered, particulate used-container glass having a closed cellular foam structure and having the following approximate concentration of foreign inclusions:

| Inclusions | % by wt. in glass |
|---|---|
| Fe | 0.1 to 3 |
| Sn | 0.1 to 2 |
| Al | 0.1 to 2 |
| Other metals | 0.1 to 1 |

4. An improved heat treatable glass mix comprising: used-container glass having the following approximate concentration of foreign inclusions mixed therewith:

| Inclusions | % by wt. in glass |
|---|---|
| Fe | 0.1 to 3 |
| Sn | 0.1 to 2 |
| Al | 0.1 to 2 |
| Other metals | 0.1 to 1 |
| Cellulosics | 0.1 to 1 |
| Other organics | 0.1 to 1 | said used-container glass having an average reflectance of between about 5% and about 95%; and
a filling agent mixed therewith to a concentration of about 10–80 percent by weight of said mix, said filling agent being coalesceable with said glass upon heating said used-container glass to a temperature and pressure within a range sufficient to sinter and soften said glass but insufficient to melt said glass.

5. The improved mix of claim 4 wherein said filler is selected from the group consisting of clay, asbestos, fiberglass and mixtures thereof, in a concentration of about 40–60 percent by weight of said mix.

6. An improved solid pressed glass product comprising a unitary mass of sintered, particulate used-container glass having the following approximate concentration of foreign inclusions:

| Inclusions | % by wt. in glass |
|---|---|
| Fe | 0.1 to 3 |
| Sn | 0.1 to 2 |
| Al | 0.1 to 2 |
| Other metals | 0.1 to 1 |
| Filling agent | 10–80 | said glass having a reflectance of between about 5% and about 95%.

7. The improved product of claim 6 wherein said filling agent is in a concentration of about 40–60 weight percent.

8. The improved product of claim 6 wherein the surfaces of said pressed product have colored oxide pigments embedded therein.

* * * * *

UNITED STATES PATENT AND TRADEMARK OFFICE
CERTIFICATE OF CORRECTION

PATENT NO. : 3,963,503
DATED : June 15, 1976
INVENTOR(S) : John D. Mackenzie

It is certified that error appears in the above-identified patent and that said Letters Patent are hereby corrected as shown below:

Column 8, line 17, change "Filling agent" to --Filler--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*